United States Patent [19]

Mijioka et al.

[11] 4,455,645

[45] Jun. 19, 1984

[54] BACK-UP CONTROL SYSTEM IMPLEMENTED WITH A REDUNDANCY SCHEME FOR PROTECTION AGAINST FAILURE

[75] Inventors: Yoshiaki Mijioka, Fujisawa; Kouichi Yamamoto, Kodaira; Taihei Suzuki; Takuji Mukaemachi, both of Yokohama, all of Japan

[73] Assignee: Hitachi, Ltd., Tokyo, Japan

[21] Appl. No.: 286,517

[22] Filed: Jul. 24, 1981

[30] Foreign Application Priority Data

Jul. 25, 1980 [JP] Japan ................................. 55/101153

[51] Int. Cl.³ .......................... H04Q 11/04; H04J 3/14
[52] U.S. Cl. ......................................... 370/16; 370/58;
340/825.01; 179/175.3 S
[58] Field of Search ................. 370/16, 58, 56; 371/8,
371/11; 340/825.01; 179/175.3 S

[56] References Cited

U.S. PATENT DOCUMENTS

| | | | |
|---|---|---|---|
| 4,071,702 | 1/1978 | Charransol | 370/16 |
| 4,245,339 | 1/1981 | Agricola et al. | 370/58 |
| 4,266,293 | 5/1981 | Anderson et al. | 370/16 |
| 4,276,637 | 6/1981 | Le Dieu | 370/16 |

Primary Examiner—Douglas W. Olms
Attorney, Agent, or Firm—Antonelli, Terry & Wands

[57] ABSTRACT

A back-up control system of a redundancy configuration suited to be used for a time division switching network. The control system includes connecting paths extending from each of the load supply devices, the paths being classified into an active connecting path and a corresponding standby connecting path coupled to different ones of the load accommodating devices which are provided in a number equal to or larger than three. The total load accommodating capacity of the load accommodating devices is provided with a margin or excess capacity which is smaller than the capacity required for accommodating all full loads supplied from the load supply devices but is not smaller than the load accommodating capacity of any one of the load accommodating devices. At least one of the load accommodating devices is connected to the active connecting path and the spare connecting path which corresponds to another one than the just mentioned active connecting path. Control means is included for performing a switching operation in such a manner that, in a normal operation, the load is supplied from each of the load supply devices through the respective active connecting path to the load accommodating device to which the just mentioned load supply device is connected, while upon occurrence of failure in a given one of the load accommodating devices, the load supplied from the associated load supply device to the fault load accommodating device through the active connecting path is transferred to another one of the load accommodating devices which is connected to the associated load supply device through the standby connecting path corresponding to the above mentioned active connecting path, whereby the load corresponding to a load accommodating capacity of the fault load accommodating device is borne by the other load accommodating devices.

10 Claims, 15 Drawing Figures

LC = LINE CONCENTRATOR
LP = LOCAL PROCESSOR
NWM = NETWORK MODULE
CP = CALL PROCESSOR

LC = LINE CONCENTRATOR
LP = LOCAL PROCESSOR
NWM = NETWORK MODULE
CP = CALL PROCESSOR

SLIC = SUBSCRIBER LINE CIRCUIT

SLIC = SUBSCRIBER LINE CIRCUIT

T = TIME SWITCH
S = SPACE SWITCH

T = TIME SWITCH
M = MEMORY
S = SPACE SWITCH

LC = LINE CONCENTRATOR

LC = LINE CONCENTRATOR

LC = LINE CONCENTRATOR

LC = LINE CONCENTRATOR

LC = LINE CONCENTRATOR

LC = LINE CONCENTRATOR

LC = LINE CONCETRATOR

LC = LINE CONCENTRATOR (a)

(b)

BACK-UP CONTROL SYSTEM IMPLEMENTED WITH A REDUNDANCY SCHEME FOR PROTECTION AGAINST FAILURE

The present invention relates to a control system for backing up an apparatus against a load failure by adopting a redundancy scheme to attain an enhanced reliability of the system. In particular, the invention concerns a back-up control system of a redundancy scheme which is particularly suited to be used in a time division switching network such as a time division telephone exchange, a time division data exchange or the like.

The switching network of the time division telephone exchange can be easily implemented in a large scale network by resorting to digital and high-multiplexing techniques. In reality, a telephone switching network having a maximum traffic capacity of 20,000 erlangs or more tends to be increasingly used for practical applications from an economical view point. The manufacturing costs of the time division switching network is significantly reduced as compared with the space division exchange. Additionally, the time division switching network is advantageous in that controls can be realized in a facilitated manner and that switching networks of a small scale to a large scale can be relatively economically implemented by stacking up a corresponding number of networks of a rather standardized configuration.

On the other hand, as the microcomputer, memory and the like devices become less and less expensive, rendering the use of the digital processor of a relatively small scale to be more economical, the time division exchange tends to be realized in a so-called building-block structure of a distributed control form by stacking up a required number of modules in each of which a switching network is integrated with a microprocessor. The building-block structure which can meet numerous and various demands with a single architecture brings about great advantages in respect of designs and productivity in the manufacture of desired switching networks.

The architecture for implementing the time division exchange in the building-block structure of the distributed control form requires a redundancy scheme as one of the fundamental structural elements.

In the case of the conventional space division network, a failure-affected area is limited to a single crosspoint or a single switch. Accordingly, no redundancy hardware is especially employed, and the failure is disposed of by blocking the affected portion at the expense of traffic being locally reduced or restricted. On the other hand, in the case of the time division network, the multiplicity is very high on the order of 30 to 4000, involving a large failure-affected area. Thus, it is common in practice to provide the time division network with a duplicated redundancy or (N+1) redundancy.

In the duplicated redundancy scheme, time division network modules each of which includes time switches and space switches as well as call processors, and operation and maintenance processors are provided in duplication and interconnected by a bus. In the normal operation, the call from a line concentrator is transmitted to the active time division network module by way of an up-PCM incoming line and thence carried to a counterpart line concentrator by way of a down-PCM outgoing line.

When a failure occurs in the active time division network module or in the call processor, an overall change-over of the whole active circuit or group is carried out under command from the operation and maintenance processor, whereby the call is carried through a standby time division network module. This system is advantageous in that the realization and the control of the system is facilitated and that the call being carried can be protected from being lost or interrupted by virtue of a satisfactory duplication. However, this system suffers shortcomings in respect of a doubled quantity of hardware as required, economy, space, electric power consumption and the like. In the case of a large scale system, a mean time between failures (MTBF) of one group of the duplicated system is too large to satisfy a system unavailability ratio (e.g. 30 minutes/20 years). As a consequence, it is necessary to communicate the active and the standby systems to each other through junctors to thereby allow the change-over to be performed on the network-module base. In this case, the junctor is doubled, to intensify the shortcomings mentioned above.

As a redundancy scheme for overcoming the drawbacks described above, there is widely known a (N+1) redundancy scheme according to which a single standby time division network module is provided for N time division network modules and adapted to be connected or disconnected through change-over switch means.

In more particular, upon occurrence of a failure in a given time division network module or in a given one of the call processors, the change-over switch associated with the fault network module is actuated under command of the operation and maintenance processor, whereby the fault network module is replaced by the standby network module as a whole to thereby assure a continuation of speech communication. This (N+1) redundancy scheme is advantageous in that the single standby network module is sufficient for disposing of the possible failure. However, because a large number of high speed change-over switches which are very expensive are required for the incoming and the outgoing lines, a great difficulty will be encountered in the realization of the scheme from the economical standpoint. As an approach to deal with such difficulty, it is conceivable that the space switch of the junctor is provided in duplication, whereby only the time switches are implemented in the (N+1) redundancy scheme. However, this approach can not yet avoid the shortcomings described above. Further, because the active system and the standby system are necessarily of different structures, not only the producibility of the exchange system is deteriorated, but also modification of the standby system is required for expansion of the active system. Besides, the length of the PCM lines can not be made uniform without difficulty.

An object of the present invention is to provide a back-up control system of an economical redundancy scheme which is simple in configuration and suited for a distributed control system of a building-block type.

Another object of the present invention is to provide a back-up control system which can be implemented with a reduced quantity of hardware without need to use the change-over switches, while assuring a high reliability.

Still another object of the present invention is to provide a back-up control system in which devices requiring redundancy schemes can be realized in a similar structure and expansion can be easily accomplished.

A further object of the present invention is to provide a back-up control system in which the length of the active and the standby lines can be made substantially equal to each other and which can minimize influence of a failure to the call being currently carried.

In view of the above objects, it is proposed according to an aspect of the invention that a total load accommodating capacity of a whole load accommodating units such as plural time division network modules for accommodating loads supplied from load supply units such as line concentrators through connecting paths such as PCM lines has a capacity for accommodating all full loads supplied from the load supply units as well as a margin or excess capacity which is smaller than the capacity for accommodating all the full loads supplied from the load supplying units but is equal to or greater than the load accommodating capacity of a given one of the load accommodating units. The connecting paths extending from the load supply units are classified into the active connecting paths and the standby connecting path, wherein the active connecting path and the corresponding standby connecting path are connected to different load accommodating units, respectively, so that at least one of the load accommodating units is connected to the active connecting path and the standby connecting path which corresponds to the active connecting path other than the just mentioned active path. In the normal operation, each of the load supply units supplies a load to the load accommodating unit connected thereto through the active connecting path. Upon occurrence of failure in a given one of the load accommodating units, the load is transferred from the fault load accommodating unit to the other load accommodating unit through the standby connecting path which corresponds to the active connecting path connected to the fault load accommodating unit. Control means is provided for effecting the change-over of the active and the standby connecting path in this manner.

The present invention will now be described in conjunction with preferred embodiments with reference to the accompanying drawings, in which.

Figure 1:
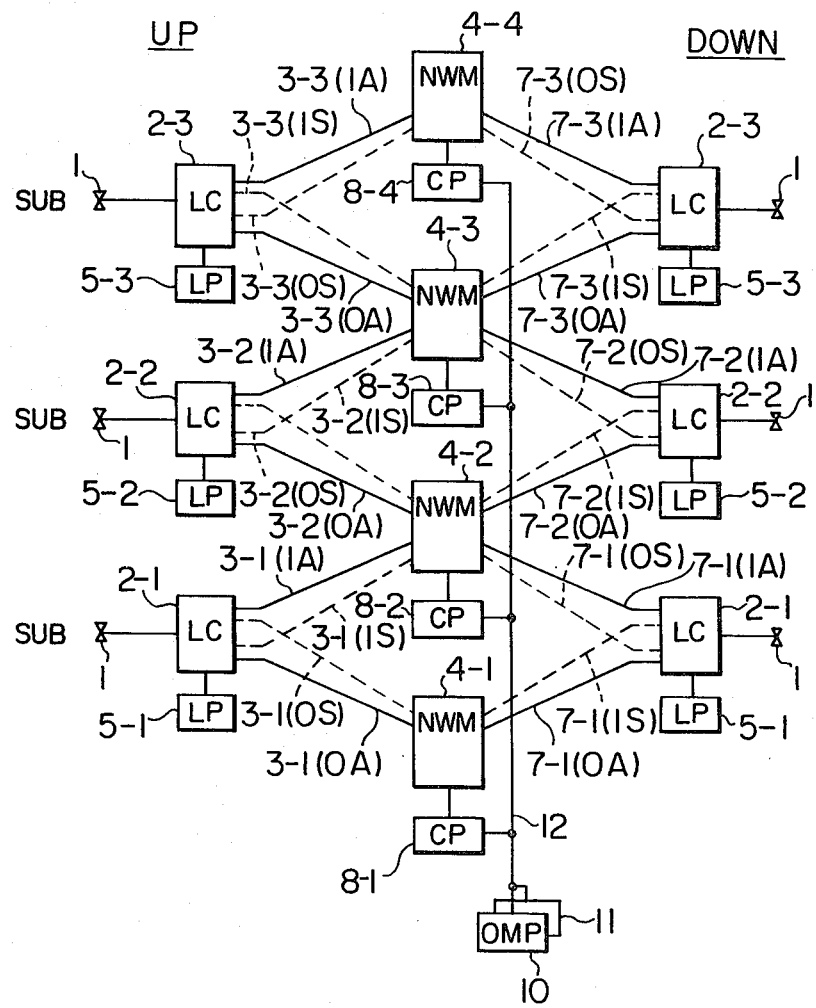
FIG. 1 shows in a block diagram a connecting arrangement of a time division switching network to which the back-up control system according to an embodiment of the invention is applied.

In the first place, the principal concept of the present invention will be briefly described on the assumption that the invention is, by way of example only, applied to a time division switching network.

First, the system is implemented in appearance in the (N+1) redundancy scheme by providing a margin corresponding to a single time division network module NWM for n NWM's.

Second, the incoming and the outgoing lines of a line concentrator are classified into two groups (group 0 and group 1) with each group being composed of an active line and a standby line. In other words, the outgoing lines and the incoming lines are classified into four subgroups.

Third, the active lines and the standby line which belong to the different groups, respectively, are combined and connected to two different NWM's, respectively. In other words, a double connection is effected.

Fourth, in normal operation, a call issued in the line concentrator is carried to the two associated NWM's through the active lines of the group 0 and the group 1 with the call being divided in halves in erlang. Upon occurrence of a failure, the call is transmitted through either one of the associated NWM's by way of the active and the standby lines, to thereby shift the call to the NWM located adjacent to the faulty NWM which is then disconnected to reorganize the system.

Now, the invention will be described in detail in conjunction with exemplary embodiments thereof by referring to the drawings.

FIG. 1 shows in a block diagram a connecting configuration of a time division switching network to which a back-up control system according to the invention is applied. Referring to FIG. 1, reference numeral 1 denotes subscribers (SUB), 2-1 to 2-3 denote line concentrators (LC), 4-1 to 4-4 denote time division network modules (NWM) composed of time switches and space switches and interconnected through junctors. Reference numerals 5-1 to 5-3 denote local processors (LP) each adapted to control the associated line concentrator LC. Numerals 8-1 to 8-4 denote call processors (CP) each constituted by a microprocessor, and numeral 10 denotes an active (currently operative) operation and maintenance processor (OMP), while numeral 11 denotes a standby operation and maintenance processor (OMP). Each of the call processors (CP) is connected to the operation and maintenance processor (OMP) through a bus 12. Reference symbols 3-1 (0A) to 3-3 (1A) and 3-1 (1A) to 3-3 (1A) denote active (currently operative) PCM incoming lines which are classified into two groups and serve for interconnection of the line concentrator (LC) and the time division network modules (NWM). Similarly, symbols 3-1 (0S) to 3-3 (0S) and 3-1 (1S) to 3-3 (1S) denote spare PCM incoming lines. As is shown in FIG. 1, one and the same time division network module can accommodate both the active incoming PCM lines of group 0 and the standby incoming PCM lines of group 1 as well as the active lines of group 1 and the spare lines of group 0. Reference symbols 7-1 (0A) to 7-3 (0A) and 7-1 (1A) to 7-3 (1A) denote the active PCM outgoing lines, while 7-1 (0S) to 7-3 (0S) and 7-1 (1S) to 7-3 (1S) denote standby PCM outgoing lines. These PCM outgoing lines are connected in the same manner as the PCM incoming lines.

Figure 2A:
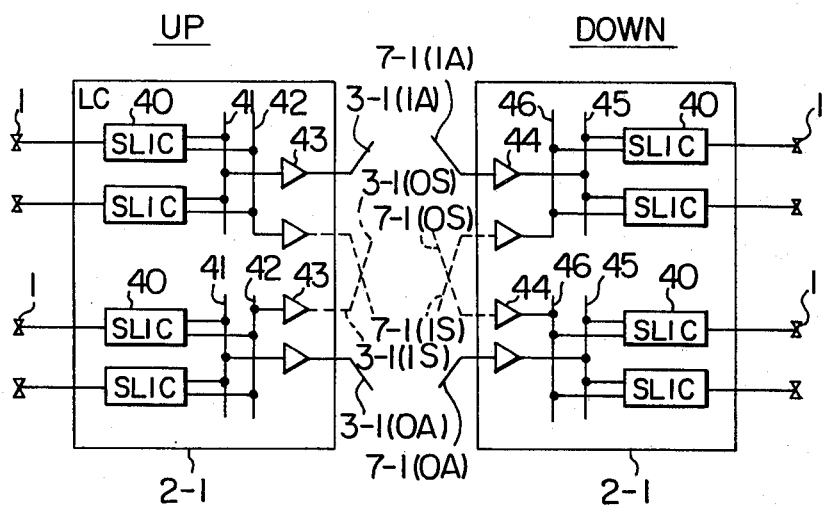
FIGS. 2a and 2b show, respectively, a speech channel network portion of line concentrators, shown in FIG. 1.
Figure 2B:
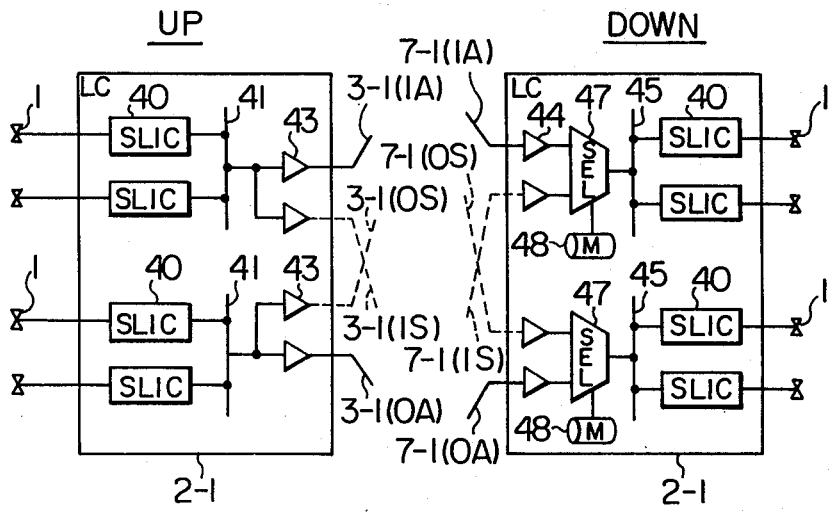

FIGS. 2a and 2b are circuit diagrams showing exemplary embodiments of a channel network portion of the line concentrator (LC) designated by 2-1 to 2-3 in FIG. 1.

In FIG. 2a, there is illustrated by way of example a channel network of the highway switching type, in which reference numeral 40 denotes a subscriber line circuit (SLIC), 41, 42, 45 and 46 denote highways (HW), 43 denotes a cable driver and 44 denotes a cable receiver. The PCM incoming lines 3-1 and the PCM outgoing lines 7-1 are accommodated in the respective time division network modules (NWM) provided separately, as is shown in FIG. 1.

A speech or voice signal from the subscriber unit 1 is converted into a PCM signal (up-signal) by the subscriber line circuit or SLIC 40 and sent out to the time division network module (NWM) through the highway (HW) 41 (or 42), the cable driver 43 and the PCM incoming line 3-1 (1A). On the other hand, a PCM signal (down-PCM signal) is transmitted to the subscriber line circuit 40 through the PCM outgoing line 7-1 (1A) of the time division network module, the cable receiver 44 and the highway (HW) 45 to be converted into an analog signal which is supplied to the counterpart subscriber unit 1. Selection and change-over of the active and standby PCM incoming lines as well as the active and standby PCM outgoing lines are accomplished through selection of the highway 41, 42 as a routine of a usual call connection processing on a channel base.

FIG. 2b shows by way of example the channel network of a channel selector configuration, in which the same elements as those shown in FIG. 2a are designated by the same reference numerals. In this figure, reference numeral 47 denotes a channel selector for selecting the PCM incoming lines on the channel base, and 48 denotes a channel memory for selecting or storing the identity of either the active or standby incoming line.

A speech or voice signal (up-signal) from the subscriber equipment 1 is converted into a PCM signal by the subscriber line circuit (SLIC) 40, whereby the resultant PCM signal is sent out to both the PCM incoming line 3-1 (1A) and 3-1 (1S) by way of the highway 41 and the cable driver 43, as in the case of the channel network shown in FIG. 2a. On the other hand, a PCM signal (down-signal) coming from the time division network module (NWM) through the active PCM outgoing line 7-1 (1A) or the spare or standby PCM outgoing line 7-1 (1S) is sent out to the highway (HW) 45 through the incoming line selected by the channel selector 47 in accordance with the information or data stored in the channel memory 48. The PCM signal fetched by the subscriber line circuit (SLIC) 40 is converted into an analog signal to be fed to the subscriber unit 1.

Next, description will be made of the time division network module (NWM).

Figure 3A:
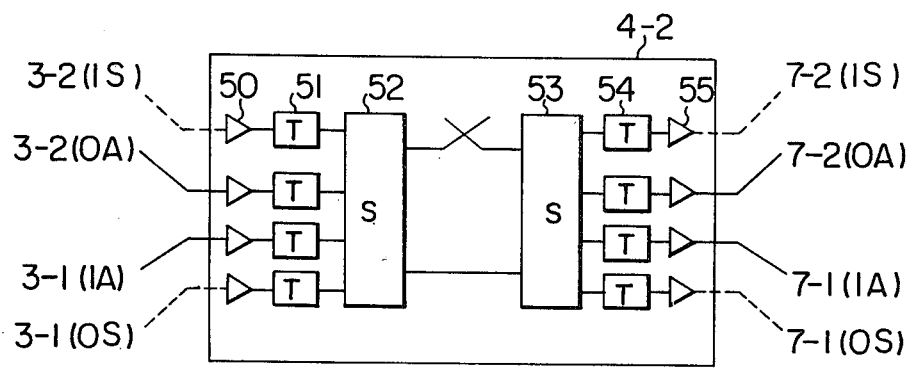
FIGS. 3a and 3b show a channel network portion of a time division network module shown in FIG. 1.
Figure 3B:
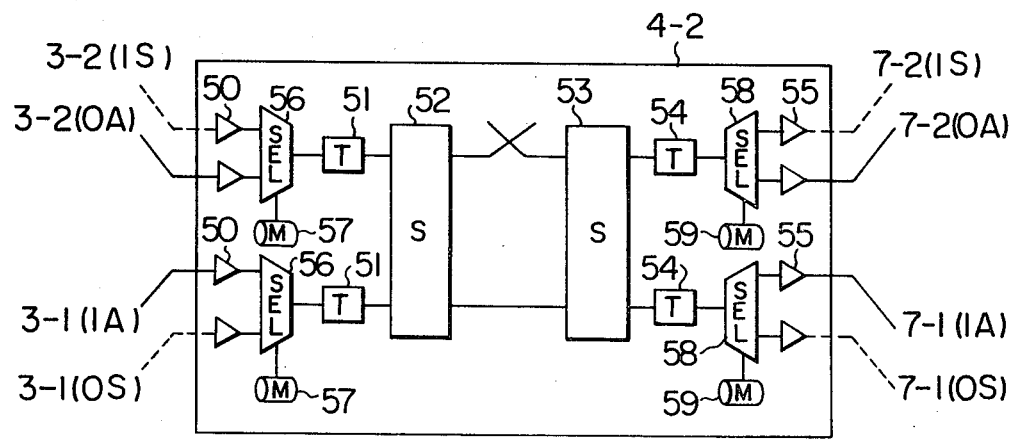

FIGS. 3a and 3b are circuit diagrams showing exemplary embodiments of the channel network of the time division network module (NWM) 4. In FIG. 3a, there is illustrated a channel network of the switch disconnection type. Referring to this figure, numeral 50 denotes a cable receiver, 51 and 54 denote time switches, 52 and 53 denote space switches and 55 denotes a cable driver. Numerals 3-1 and 3-2 denote the PCM incoming lines, while 7-1 and 7-2 denote the PCM outgoing lines. These lines are connected to the respective line concentrator (LC), as is shown in FIG. 1.

The PCM signal from the active PCM incoming lines 3-1 (1A), 3-2 (0A) or the standby PCM incoming lines 3-1 (0S), 3-2 (1S) is received by the cable receiver 50 and stored in the time switch 51 under the control of a controller. The PCM signal stored in the time switch 51 is coupled to the cable driver 55 by way of the space switches 52 and 53 and the time switch 54 in accordance with the well known principle of time division exchange, and sent out to the line concentrator (LC) through the PCM outgoing line 7-1 or 7-2. Selection and change-over of the active PCM incoming line, the active PCM outgoing line, the standby PCM incoming line and the standby PCM outgoing line can be accomplished only through control by the channel memory as in the case of the conventional line connection, because the PCM lines as accommodated are considered to be merely doubled or duplicated.

FIG. 3b shows an exemplary embodiment of a time division network module (NWM) of the channel selector type. In this figure, same parts as those shown in FIG. 3a are denoted by the same reference numerals. Referring to FIG. 3b, numeral 56 denotes an incoming channel selector, 57 denotes an incoming channel memory, 58 denotes an outgoing channel selector, and numeral 59 denotes an outgoing channel memory. Functions and operations of these channel selectors are similar to those of the channel selector 47 and the channel memory 48 described above in conjunction with FIG. 2b. More specifically, calls coming from the PCM incoming line 3-2 (0A) or 3-2 (1S) are selected by the incoming channel selector 56 on the channel base and written in the time switch 51. The PCM signal written in the time switch 54 is sent out to the PCM outgoing line 7-2 (0A) or 7-2 (1S) as selected by the outgoing channel selector 58 on the channel base.

Figure 4A:
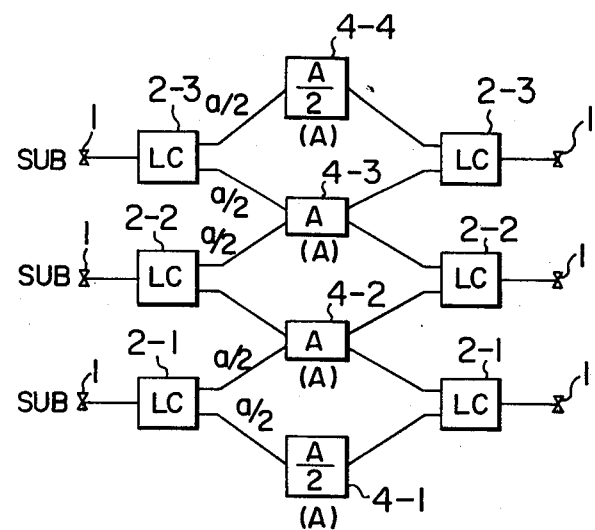
FIGS. 4a and 4b and FIGS. 5a and 5b illustrate connections in the switching network shown in FIG. 1 in a normal operation and upon occurrence of failure, respectively.
Figure 4B:
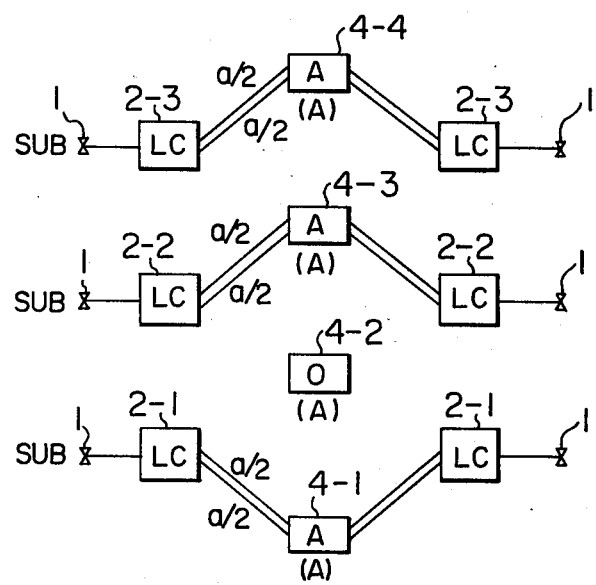

FIG. 4a illustrates a normal operating state of the connecting arrangement shown in FIG. 1, while FIG. 4b shows a connection diagram to illustrate an operating state when a failure occurs in one of the time division network modules (NWM).

Next, overall operations of the system shown in FIG. 1 will be described.

In the first place, a description of the operation in the normal state will be made by referring to FIG. 4a in combination with FIGS. 1, 2 and 3.

A call (up-call) of a erlangs issued in the line concentrator (LC) 2-1 is carried to the network modules (NWM) 4-1 and 4-2 by way of the active PCM incoming lines 3-1 (0A) and 3-1 (1A) at a rate of a/2 erlangs, respectively. On the other hand, the call (down-call) from the network modules (NWM) 4-1 and 4-2 is carried to the line concentrator (LC) 2-1 through the PCM outgoing lines 7-1 (0A) and 7-1 (1A) each at a/2 erlangs. In a similar manner, the call issued in the line concentrator (LC) 2-2 is transmitted to the time division network modules or NWM's 4-2 and 4-3 through the PCM outgoing lines 3-2 (0A) and 3-2 (1A) each at a/2 erlangs, while a call issued in the line concentrator or LC 2-3 is carried to the NWM's 4-2 and 4-3 through the PCM incoming lines 3-3 (0A) and (1A) each at a/2 erlangs. Although only three line concentrators (LC) are shown in the drawings, it will be understood that a number of the line concentrators can be connected to the NWM so far as the traffic capacity A (erlangs) of the NWM permits. However, the same connecting configuration as those illustrated has to be preserved. Thus, in the normal operating state, the top and the bottom NWM's 4-1 and 4-4 are operated at a trafic reduced by ½ as compared with that of the other NWM's.

Next, description will be made on the operation when a failure occurs in the time division network module NWM. Assuming that the occurrence of failure in the NWM 4-2 (or the call processor 8-2) is detected, the operation and maintenance processor (OMP) 10 (or 11) issues a switching command to each of the call processors (CP) 8-1 to 8-4. Upon receipt of the switching command, the call processor issues a line switching command to the line concentrator (LC) which belongs to that call processor. In response to the switching command, the line concentrator (LC) performs control operation such that the call transmission is effected through the standby line from the next issued call in the call-correspondence manner (i.e. on the channel base) described hereinbefore in conjunction with FIGS. 2a and 2b. More specifically, the call generated in the line concentrator (LC) 2-3 is carried to the NWM 4-4 by way of the PCM incoming line 3-3 (1A) and the PCM incoming line 3-3 (0S). On the other hand, the traffic on the PCM incoming line 3-3 (0A) is reduced progressively in response to on-hook (or clear-back) signals, resulting in that the call or traffic of a erlangs issued in the line concentrator is finally all transmitted through the network module NWM 4-4. The time required for this switching operation will be several times longer than the average hold time and usually on the order of several minutes. Further, the call issued in the line concentrator (LC) 2-2 is simultaneously carried to the network module (NWM) 4-3 through the PCM incoming line 3-2 (1A) and the PCM incoming line 3-2 (0S) as in the case of the call in the line concentrator (LC) 2-3, while the call in the line concentrator or LC 2-1 is concurrently transmitted to the NWM 4-1 by way of the PCM incoming lines 3-1 (0A) and 3-1 (1S). In other words, the calls are transmitted along routes or paths illustrated in FIG. 4b, whereby the time division network module (NWM) 4-2 is disconnected in terms of traffic within several minutes.

On the other hand, the call being transmitted through the faulty NWM 4-2 (i.e. the call in process) is processed in a manner described below. When the failure occurs in the call processor (CP) 8-2, the call is held normally until the speech has come to an end. The processing to this end is performed by the associated line concentrator LC. When the failure occurs in the time switch (e.g. 51 shown in FIG. 3a) of the time division network module NWM, calls in process which correspond to the multiplicity (e.g. 30 to 256) of the fault time switch will be interrupted. The same applies to the failure of the space switch, resulting in that the calls corresponding to the multiplicity of the fault space switch will be lost. However, other calls will be held normally to the end of speeches.

In the case where the interrupted call has to be automatically saved from being lost, copies of informations such as pass words for the individual calls may be stored in the adjacent call processors in addition to the associated call processors (e.g. by transmitting the pass words to the adjacent call processors for every call through the bus 12 shown in FIG. 1), to thereby allow a new route to be forcively established under the control of the adjacent call processor upon occurrence of failure, whereby the continuity of the call or speech can be assured. When the transfer of the call mentioned above has been completed, the fault network module NWM is repaired by resorting to replacement of electronic package, for example.

Further, when a log of time is required for the transfer or change-over mentioned above due to the presence of a call of long duration, then forcible disconnection may be effected by resorting to interruption.

When the fault module has been repaired and the normal operability thereof has been confirmed, the repaired network module or NWM 4-2 is again inserted in the associated channel, to thereby restore the normal state illustrated in FIG. 4a from the operation state illustrated in FIG. 4b. It will be obvious that such restoration can be accomplished by transferring the call to the active (A) lines from a new issued call in the manner similar to the aforementioned transfer to the standby lines.

Figure 5A:
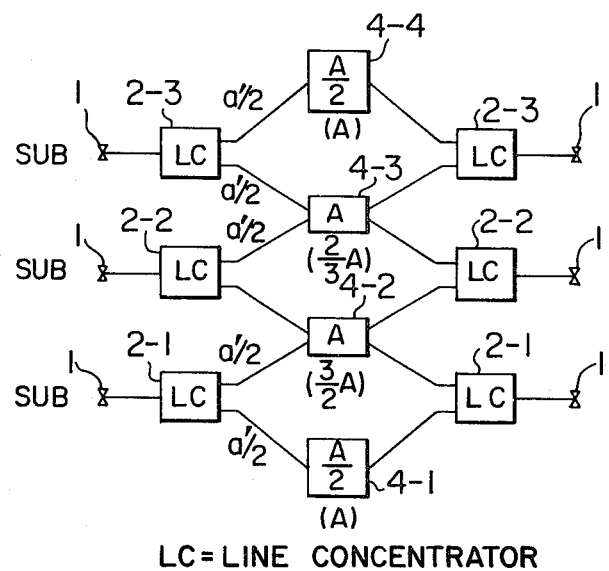
Figure 5B:
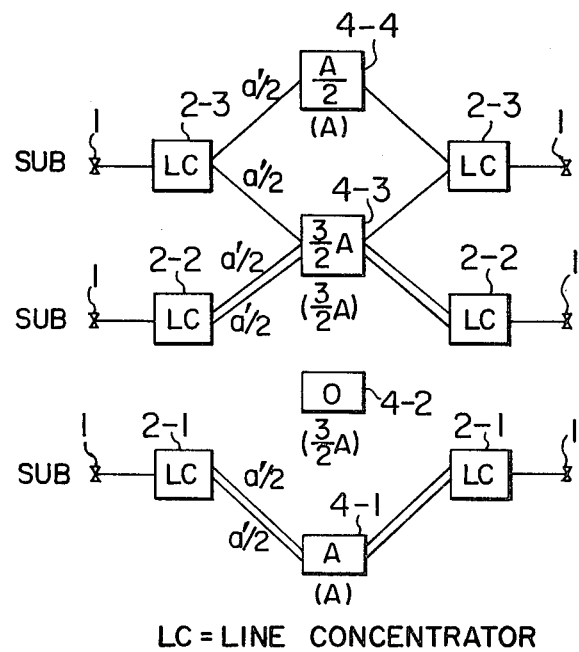

FIGS. 5a and 5b show a modification of the connecting configuration shown in FIG. 4. The arrangement shown in FIG. 5 differs from the one shown in FIG. 4 in that the maximum traffic of every NWM of the arrangement shown in FIG. 4 is A erlangs, while in the case of the modification shown in FIG. 5 the network modules or NWM's located at both ends are imparted with traffic capacity of A erlangs, while the intermediate NWM's located between the end NWM's is imparted with a traffic capacity of 3/2A erlangs.

The normal operation takes place in the same manner as illustrated in FIG. 4a, in which the end NWM's are operated at the traffic rate of A/2 erlangs, while the intermediate NWM's are operated at the traffic rate of A erlangs, as can be seen from the illustration of FIG. 5a.

Assuming now that a failure occurs in the network module NWM 4-2, operation takes place in the same manner as described hereinbefore in conjunction with FIGS. 4a and 4b, whereby the call carried to the NWM 4-2 from the line concentrator or LC 2-1 at the traffic rate of a/2 erlangs is transferred to the NWM 4-1, while the call carried to the NWM 4-2 from the LC 2-2 at the rate of a/2 erlangs is shifted to the NWM 4-3. Thus, the NWM 4-1 and the NWM 4-3 are operated under full loads of A erlangs and 3/2A erlangs, respectively, while the NWM 4-4 is operated at the traffic of A/2 erlangs as is in the case of the normal operation. In this manner, the shifting or transfer of the call is restricted only to the NWM located adjacent to the fault NWM, to an advantage.

Figure 6A:
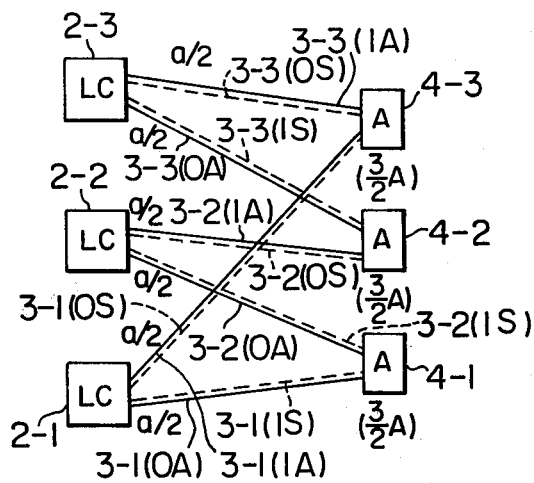
FIGS. 6a and 6b and FIGS. 7a and 7b show connections according to other embodiment of the invention.
Figure 6B:
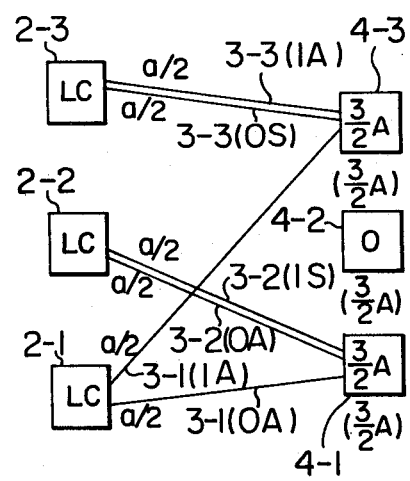

The foregoing description is based on the assumption that four time division network modules (NWM) are installed for three line concentrators (LC). In general, it is not necessarily required to provide the four NWM's. Rather, it is sufficient to afford a margin of traffic capacity for the total traffic capacity of all the NWM's against the total traffic capacity required from the side of the line concentrators (LC) so that a failure occurring in one of the NWM's can be disposed of. FIGS. 6a and 6b show in principle an exemplary system arrangement built so as to meet the condition described above. It will seen that three NWM's are provided for three line concentrators (LC).

In the case of the embodiment shown in FIGS. 6a and 6b, the permissible traffic rate of the individual NWM is 3/2A erlangs. This is to say that the network is in substance implemented in a redundancy scheme. In the case of the normal operation, the call of a erlangs issued in the line concentrator LC 2-1 is carried to NWM 4-1 and NWM 4-3 through the active PCM incoming lines 3-1 (0A) and 3-1 (1A) at the traffic rate of a/2 erlangs, respectively, as can be seen from FIG. 6a. In a similar manner, the call generated in the LC 2-2 is carried to the NWM's 4-1 and 4-2 through the associated active lines at a/2 erlangs, while the call generated in the LC 2-3 is carried to the NWM's 4-2 and 4-3 through the respective active lines at a/2 erlangs. The active lines are represented by solid lines in FIG. 6a.

Now assuming that a failure occurs in the NWM 4-2, the call of a/2 erlangs being carried by way of the active incoming line 3-2 (1A) is transferred to the spare or standby incoming line 3-2 (1S). In a similar manner, the call being carried by way of the active incoming line 3-3 (0A) is transferred to the spare or standby line 3-3 (0S). As a result, the call to the NWM 4-2 is shifted to the NWM 4-1 and the NWM 4-3. Thus, the NWM 4-1 and 4-3 are operated under the full load corresponding to the traffic of 3/2A erlangs (3A erlangs in sum total), whereby all the calls from the line concentrators or LC's 2-1 to 2-3 can be saved, i.e. protected from being lost.

In the foregoing description, it has been assumed that the PCM outgoing lines from the individual line concentrators (LC) and time division network modules (NWM) are divided into two groups, i.e. the group 0 and the group 1, wherein the lines in each group is subdivided into the active and the spare or standby lines. However, it will be self-explanatory that these PCM outgoing lines may be classified into three or more groups for transmitting the call to the different NWM's through division. For the same reason, different line concentrators of which lines are divided into two, three or more groups may be employed in combinations.

Further, it is possible to implement a system in which the lines are not grouped in the manner described above, but only the active and the standby lines from each of the line concentrators are sequentially accommodated in the different NWM's located adjacent to one another. An examplary embodiment of this scheme is illustrated in FIG. 7.

Referring to FIG. 1, the primary difference of the illustrated system from those described above in which the lines are divided into two or more groups resides in that the former requires the use of a time division network module (NWM) 4-1 adapted to accommodate only the active lines and a time division network module (NWM) 4-4 for accommodating only the spare or standby lines in addition to the NWM's 4-2 and 4-3 each for accommodating both the active and the standby lines as in the case of the preceding embodiments.

Figure 7A:
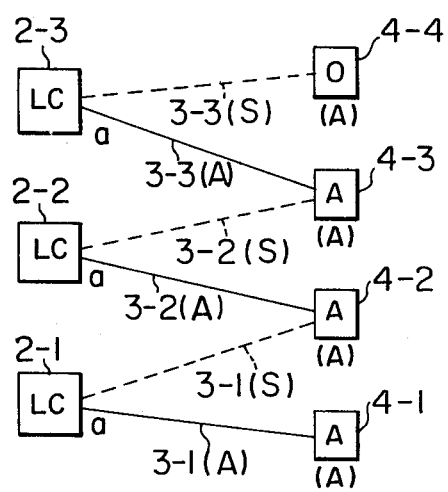
Figure 7B:
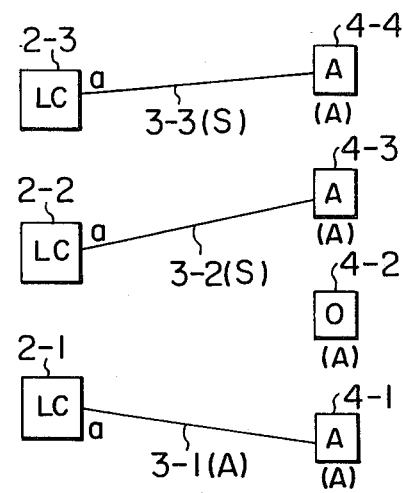

In the normal operation of this system, the call of a erlangs issued in the line concentrator (LC) 2-1 is carried to the network module or NWM 4-1 exclusively through the active line 3-1(A), as is illustrated in FIG. 7a. In a similar manner, the call generated in the LC 2-2 is transmitted exclusively to the NWM 4-2, while the call generated in the LC 2-3 is carried to the NWM 4-3 exclusively. When a failure occurs in the NWM 4-2, the call of a erlangs being carried through the active line 3-2 (A) is transferred to the standby line 3-2 (S), while the call of a erlangs carried through the active line 3-3 (A) is transferred to the standby line 3-3 (S), resulting in that the call to the NWM 4-2 is shifted to the NWM 4-3 with the call to the NWM 4-3 being shifted to the NWM 4-4. As the consequence, a calls from the LC's 2-1 to 2-3 are processed for connection by the NWM's 4-1, 4-3 and 4-4.

As will be appreciated from the descriptions made so far, the present invention can be embodied in various manners. In the following, the general concept of the invention will be elucidated.

Figure 8:
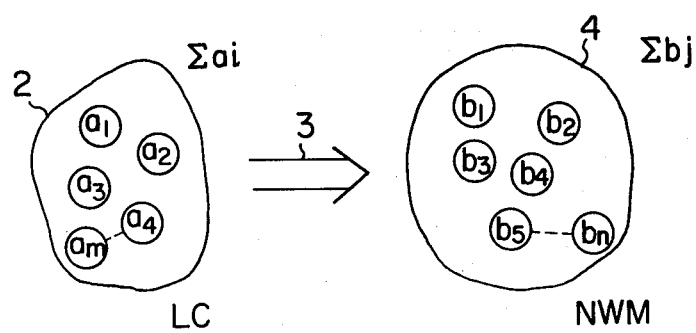
FIG. 8 illustrates relationship in traffic between line concentrators and time division network modules.

FIG. 8 schematically illustrates a relationship in traffic between the line concentrators (LC) and the time division network modules (NWM). In this figure, $a_1, a_2, \ldots, a_m$ represent the maximum traffic of the m line concentrators, respectively, while $b_1, b_2, \ldots, b_n$ represent the permissible traffic capacity or rates of the n time division network modules, respectively. The maximum traffic carried through the lines 3 from the m LC's 2 are represented by $$\sum_{i=1}^{m} a_i$$

(erlangs). In order to process all the calls $\Sigma a_i$ (erlangs) corresponding to the maximum traffic, the traffic capacity $$\sum_{j=1}^{n} b_j$$

(erlangs) of the NWM's 4 has to be greater than $\Sigma a_i$ (erlangs). Further, in order to deal with a failure which will possibly occur in one of the n NWM's, a margin or excess capacity must be provided to insure that at least the traffic carried through the fault NWM which amounts possibly to the maximum traffic $(b_j)_{max}$ (erlangs) can be processed by other NWM. In other words, the following condition must be satisfied. Namely, $$\Sigma b_j \geq \Sigma a_i + (b_j)_{max} \text{(erlangs)} \tag{1}$$

On the other hand, the system according to the invention of which the permissible capacity is imparted in substance with (N+1) redundancy while avoiding the doubled permissible traffic (i.e. $\Sigma a_j = 2\Sigma a_i$ in erlangs) of the prior duplicated system does obviously satisfy the condition stated below. Further, it will be appreciated that at least three NWM's are required in order to deal with a failure to which one of the NWM's may be subjected. Besides, the capacity of each of the NWM is naturally smaller than $\Sigma a_i$.

$$\Sigma b_j < 2\Sigma a_i \text{(erlangs)} \tag{2}$$

Next, structural or configurational conditions imposed on the inventive system in implementation thereof will be described.

Figure 9:
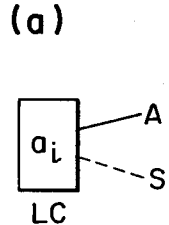
FIG. 9 illustrates connecting manners of active line and standby line.
Figure 9:
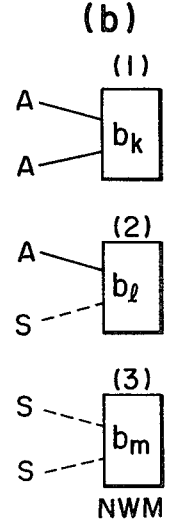

FIG. 9 illustrates the ways in which the active and the spare or standby lines of the line concentrator (LC) and the time division network module (NWM) are connected. As can be seen from FIG. 9(a), it goes without saying that each of the LC's must be indispensably provided with a certain number of the active lines (A) and a corresponding number of the spare or standby lines (S), which lines (A and S) are connected to the different counterpart units (the different NWM's in the case of the illustrated embodiments) in order to dispose of a fault which will possibly occur in any one of the counterpart units or NWM's.

On the other hand, the time division network modules are classified into the first type NWM which accommodates only the active lines (A), the second type NWM which accommodates both the active (A) and the standby (S) lines and the third type NWM which accommodates only the spare or standby lines (S). In this connection, it should be noted that, although the active lines (A) and the corresponding spare or standby lines (S) are accommodated by the different NWM's, it is disadvantageous from the economical standpoint that the spare or standby lines (S) from all of the LC's be accommodated by a specified one of the NWM. Accordingly, the NWM system should indispensably include the NWM which is capable of accommodating in common both the active and the standby lines, as is illustrated in FIG. 9(a) at (2).

For interconnection of the LC and the NWM through the active lines and the spare or standby lines, the conditions given by the expressions (1) and (2) should naturally be satisfied. Additionally, consideration has to be taken so that the permissible traffic (or traffic capacity) of the whole NWM system is reduced to a possible minimum and the length of the lines be as uniform as possible.

The foregoing descriptions have been made on the assumption that the invention is applied to a time division telephone exchange. However, the present invention does not impose in substance any particular restrictions on the call (load in general terms) being carried or transmitted, and thus may be applied to various information systems inclusive of data exchange systems. In more general terms, the invention may be applied to numerous system in which a back-up operation or control is required.

As will be appreciated from the foregoing descriptions, the present invention, which takes advantage of the (N+1) redundancy scheme in that the quantity of hardwares for the redundancy of the time division network module and the call processor is reduced by a factor of 1/N, is excellently advantageous in that no change-over switches are required for the PCM outgoing and incoming lines of the line concentrator and the junctors, which in turn means that a great degree of choice is assured in design of the time division switching network system.

In addition, by adopting the call transfer system in which the call transfer or shift is performed upon issuing of a new call, all the calls being carried can be saved without being lost in the case of failure in the call processor, while in the case of failure in the time division network module a major part of the calls being carried can be prevented from being lost. Besides, the channel-based selection of the PCM outgoing lines and the PCM incoming lines between the line concentrators and the time division network modules (NWM) allows the call processing to be executed in the same manner as the conventional call processing and thus provides a great contribution to simplification of the program in concern.

In this way, the present invention makes it possible to implement the concerned system economically with a high reliability comparable to that of the duplicated system with a reduced quantity of hardwares required for the adopted redundancy scheme as compared with the (N+1) redundancy scheme. Further, individual devices such as the time division network module which requires the redundancy structure can be implemented in a substantially standardized configuration. Besides, expansion of the system can be easily accomplished, to another advantage. In addition, possibility of the length of the active and the standby lines being substantially the same is advantageous to the system which is sensitive to a difference in the transmission time. Finally, grouping of the active and the standby lines into a plurality of groups (0-group, 1-group and so forth) permits the call transfer for dealing with a failure to be effected only locally, thus minimizing influence on the calls being carried.

What is claimed is:

1. A back-up control system comprising:
   (a) at least first and second load supply devices;
   (b) at least first, second and third load accommodating devices for accommodating loads supplied from said load supply devices, the total load accommodating capacity of said first, second and third load accommodating devices having a margin capacity not smaller than the load accommodating capacity of any given one of said load accommodating devices in addition to a capacity capable of accommodating all full loads supplied from said load supply devices;
   (c) a first line group connected to said first load supply device, said first line group being classified into first and second sub-groups each of which includes a line pair formed of an active and a standby line, the active line of said first sub-group and the standby line of said second sub-group in said first line group being accommodated in said first load accommodating device, the standby line of said first sub-group and the active line of said second sub-group in said first line group being accommodated in said second load accommodating device adjacent to said first load accommodating device;
   (d) a second line group connected to said second load supply device, said second line group being classified into first and second sub-groups each of which includes a line pair formed of an active and a standby line, the active line of said first sub-group and the standby line of said second sub-group in said second line group being accommodated in said second load accommodating device, the standby line of said first sub-group and the active line of said second sub-group in said second line group being accommodated in said third load accommodating device; and
   (e) control means for controlling said line groups, during a normal operation, so that the load from each of said load supply devices is supplied to an adjacent two of said load accommodating devices through the active lines in the first and second sub-groups of the associated line group, and for effecting a change-over operation for the active and standby lines, upon occurrence of failure in a given one of said load accommodating devices, so that the loads from the load supply devices associated with the fault load accommodating device are supplied, through the standby lines paired with the active lines accommodated in said fault load accommodating device, to the load accommodating devices in which those standby lines are accommodated, respectively, whereby the load corresponding to the load accommodating capacity of said fault load accommodating device can be accepted by the other load accommodating devices.

2. A back-up control system comprising:
   (a) n load supply means each of which is capable of supplying a maximum load of A, n being an integer equal to or greater than 2;
   (b) n+1 load accommodating means each of which has the maximum load accommodating capacity of A;
   (c) n line groups the i-th one of which is connected to the i-th one of said n load supply means, each of said line groups being classified into first and second sub-groups each of which includes a line pair of an active and a standby line, the active line of the first sub-group and the standby line of the second sub-group in the i-th line group being connected to the i-th load accommodating means, the standby line of the first sub-group and the active line of the second sub-group in the i-th line group being connected to the (i+1)th load accommodating means adjacent to the i-th load accommodating means; and (d) control means for controlling said line groups, during a normal operation, so that the load from the i-th load supply means is supplied to the adjacent i-th and (i+1)th load accommodating means through the active lines in the first and second sub-groups of the i-th line group, and for effecting a change-over operation for the active and standby lines, upon occurrence of failure in a given j-th one of said n+1 load accommodating means, so that the active line in the second sub-group of the (j−1)th line group connected to the faulty j-th load accommodating means is changed over to the standby line paired with that active line to supply the load from the (j−1)th load supply means through that standby line to the (j−1)th load accommodating means to which that standby line is connected, while the active lines in the second sub-groups of the line groups connected to the (j−2)th, (j−3)th, - - - and 1st load supply means are changed over to the standby lines paired with those active lines, respectively, to supply the loads from the (j−2)th, (j−3)th, - - - and 1st load supply means to the (j−2)th, (j−3)th, - - - and 1st load accommodating means, respectively, and so that the active line in the first sub-group of j-th line group connected to said fault j-th load accommodating means is changed over to the standby line paired with that active line to supply the load from the j-th load supply means through that standby line to the (j+1)th load accommodating means to which that standby line is connected, while the active lines in the first sub-groups of the line groups connected to the (j+1)th, (j+2)th, - - - and n-th load supply means are changed over to the standby lines paired with those active lines, respectively, to supply the loads from the (j+1)th, (j+2)th, - - - and n-th load supply means to the (j+2)th, (j+3)th, - - - and (n+1)th load accommodating means respectively.

3. A back-up control system comprising:
(a) n load supply means which are capable of supplying the same maximum loads, respectively, n being an integer not smaller than 2;
(b) n+1 load accommodating means each of which having a capacity to accept the maximum load supplied from each of said load supply means;
(c) n line groups the i-th one of which is connected to the i-th one of said load supply means, each of said line groups including an active line and a standby line, the active line in the i-th line group being connected to the i-th load accommodating means, the standby line in the i-th line group being connected to the (i+1)th load accommodating means adjacent to the i-th load accommodating means; and
(d) control means for controlling said line groups, during a normal operation, so that the i-th load supply means and the i-th load accommodating means are connected through the active line in the i-th line group, and for effecting a change-over operation for the active and standby lines, upon occurrence of failure in a given j-th one of said n+1 load accommodating means, so that in each of the j-th line group, the (j+1)th line group, - - - and the n-th line group the active line in that line group is changed over to the standby line in that line group.

4. A back-up control system of a time division exchange, comprising:
(a) at least first and second line concentrator means;
(b) at least first, second and third time division network switching means to which calls issued from said line concentrator means are carried, the total permissible traffic capacity of said switching means being selected to have a margin or excess capacity not smaller than the permissible traffic capacity of any given one of said switching means in addition to a capacity capable of accommodating all full traffic incoming from said line concentrator means;
(c) at least first and second line groups provided in correspondence with said line concentrator means, each of said line groups being classified into first and second sub-groups each of which includes an active line and a standby line corresponding thereto, the active line of the first sub-group and the standby line of the second sub-group in the first line group being accommodated in said first switching means while the standby line of the first sub-group and the active line of the second sub-group in the first line group being accommodated in said second switching means, and the active line of the first sub-group and the standby line of the second sub-group in the second line group being accommodated in said second switching means while the standby line of the first sub-group and the active line of the second sub-group in the second line group being accommodated in said third switching means; and
(d) control means for controlling a change-over operation for the active and corresponding standby lines so that, in a normal operation, the call from each of said line concentrator means is carried to an adjacent two of said switching means through the active lines of the first and second sub-groups in the line group corresponding to that line concentrator means, and so that, upon occurrence of failure in a given one of said switching means or a given one of said active lines, the standby line corresponding to the active line accommodated in said faulty switching means or the standby line corresponding to said faulty active line is used to carry the call to the switching means in which that standby line is accommodated, whereby the call corresponding to the permissible traffic capacity of said faulty switching means can be processed by the other switching means.

5. A back-up control system according to claim 4, wherein said control means includes respective selection and change-over means provided in correspondence with said switching means, each of selection and change-over means having a memory for storing information concerning the change-over of the active and standby lines, the lines being selectively changed over in accordance with the contents of said memory.

6. A back-up control system according to claim 4, wherein said control means includes respective selection and change-over means provided in correspondence with said switching means, each of said selection and change-over means having switches provided in correspondence with the active and standby lines, respectively, the lines being selectively changed over in accordance with the selection of said switches.

7. A back-up control system according to claim 4, wherein said control means includes respective selection and change-over means provided in correspondence with said concentrator means, each of said selection and change-over means having a memory for storing information concerning the change-over of the active and standby lines, the lines being selectively changed over in accordance with the contents of said memory.

8. A back-up control system according to claim 4, wherein control means includes respective selection and change-over means provided in correspondence with said line concentrator means, each of said selection and change-over means having switches provided in correspondence with the active and standby lines, respectively, the lines being selectively changed over in accordance with the selection of said switches.

9. A back-up control system according to claim 4, including means responsive to occurrence of failure in said faulty switching means for supplying calls newly issued from the line concentrator which correspond to the standby line corresponding to the active line accommodated in said faulty switching means, through that standby line to the switching means in which that standby line is accommodated, while call being currently carried is held through the active line until the speech carried thereby has come to an end.

10. A back-up control system for a time division exchange, comprising:
(a) n line concentrator means each of which includes a plurality of subscriber line circuits and having a capacity to accommodate substantially the same traffic;
(b) n+1 time division switching means by which calls issued from said line concentrator means are processed, each of said switching means being capable of processing an amount of traffic substantially equal to the traffic which any one of said line concentrator means can accommodate;
(c) n PCM line groups the i-th one of which is connected to the i-th one of said n line concentrator means, each of said PCM line groups being classified into first and second sub-groups each of which includes an active line and a standby line corresponding thereto, the active line of the first sub-group and the standby line of the second sub-group in the i-th PCM line group being connected to the i-th switching means, the standby line of the first sub-group and the active line of the second sub-group in the i-th PCM line group being connected to the (i+1)th switch means; and
(d) control means for controlling a change-over operation for the active and corresponding standby lines so that, in a normal operation, the call from each of said line concentrator means is processed by an adjacent two of said switching means through the active lines of the first and second sub-groups in the PCM line group corresponding to that line concentrator means, and so that, upon occurrence of failure in a given one of said switching means, the active line connected to said faulty switching means is changed over to the standby line corresponding to that active line to process the call carried through the standby line by way of the switching means connected to that standby line and the active line of one of the first and second sub-groups in each of siad PCM line groups is changed over to the corresponding standby line of said one sub-group to connect one of said line concentrator means and one of said switching means through the standby line of said one sub-group and the active line of the other sub-group in that PCM line group, whereby the traffic which was processed by said faulty switching means can be processed by the other n switching means.

* * * * *